United States Patent [19]

Conover, Jr. et al.

[11] Patent Number: 4,576,487
[45] Date of Patent: Mar. 18, 1986

[54] THERMALLY RESPONSIVE ELECTRICAL CONTROL DEVICE AND MONITORING CIRCUIT THEREFOR

[75] Inventors: Gilbert Conover, Jr., Providence; Gary R. Richard, West Greenwich, both of R.I.

[73] Assignee: Independent Energy, Inc., East Greenwich, R.I.

[21] Appl. No.: 573,047

[22] Filed: Jan. 23, 1984

[51] Int. Cl.$^4$ ............................................. G01K 7/00
[52] U.S. Cl. ..................................... 374/183; 374/179
[58] Field of Search ............... 374/163, 176, 178, 179, 374/182, 183, 185; 324/441, 224; 340/599, 595; 307/117

[56] References Cited

U.S. PATENT DOCUMENTS

| | | | |
|---|---|---|---|
| 3,609,728 | 9/1971 | Quinn | 374/183 |
| 3,636,540 | 1/1972 | Harris | 340/599 |
| 3,875,424 | 4/1975 | Hopkins | 307/117 |
| 4,068,138 | 1/1978 | Miyakawa et al. | 340/595 |
| 4,186,315 | 1/1980 | Benton | 307/117 |
| 4,415,790 | 11/1983 | Diesch et al. | 340/599 |

Primary Examiner—Charles Frankfort
Assistant Examiner—David R. Schuster
Attorney, Agent, or Firm—Salter & Michaelson

[57] ABSTRACT

A thermally responsive electrical control device is operable for producing a control signal having first and second voltage levels for controlling the operation of a system actuating device for first and second modes of operation. One embodiment of the device includes a multiple bridge circuit for sensing two temperatures and for making multiple control decisions in response to the two temperatures. Another embodiment of the device includes a thermistor and a nonlinear variable resistance element which is matched in a substantially linear relation with the thermistor for compensating for the inherent substantially nonlinear character of the thermistor. Still another embodiment of the device includes a monitoring circuit which is interconnected to a bridge circuit of the device for providing visual indications of sensed temperatures without significantly interrupting the control function of the device.

5 Claims, 3 Drawing Figures

THERMALLY RESPONSIVE ELECTRICAL CONTROL DEVICE AND MONITORING CIRCUIT THEREFOR

BACKGROUND AND SUMMARY OF THE INVENTION

The instant invention relates to thermally responsive control devices and more particularly to a thermally responsive electrical control device and to a monitoring circuit which is operable in combination therewith.

A number of types of thermally responsive control devices have heretofore been available for various applications. In this connection, one common type of thermally responsive control device heretofore available is a type commonly referred to as an electromechanical control device which utilizes the thermal expansion of a fluid contained therein for actuating contacts. Devices of this type, however, have only been operative over limited temperatures ranges which are usually less than 100° F. and have displayed only marginal degrees of accuracy. They have also not provided any means for displaying or indicating sensed temperatures. A number of inexpensive electronic control devices have also been heretofore available, but these devices have also only been operable over limited temperature ranges, such as ranges of between 50° and 100° F. and have not had high degrees of accuracies because they have depended on the accuracies of components connected thereto. Most of these devices have only been operative for performing single control functions for each sensed temperature, and any of the heretofore available devices of this type which have been operative for multiple control functions have only been adapted for limited applications. In addition, most of the heretofore available control devices of this type have not been operable in combination with means of providing visual indications of sensed temperatures. In this regard, the only heretofore available electronic control devices of this type which have been operable in combination with means for providing visual temperature displays have required on and off switching functions. Specifically, they have required switched interruptions in the controlling functions thereof during monitoring operations so that they have been inoperative for controlling during the periods when the temperatures are monitored for visual indications. This type of operation is undesirable for many control systems. Thermally responsive electronic controls having internal microcomputer components have also been heretofore available and have proven to be effective for a number of applications, however, controls of this type have been relatively expensive, and therefore their use has been somewhat limited by this factor.

The instant invention provides an effective thermally responsive electrical control device which is operable in combination with the monitoring circuit of the instant invention for providing a control and monitoring device which overcomes many of the disadvantages of the known devices. The control device of the instant invention is operative for providing multiple control functions in response to single sensed temperatures, and when it is combined with the monitoring circuit of the instant invention, visual indications of sensed temperatures can be provided as well as visual indications of control parameters. The visual indications provided by the monitoring circuit allow the control parameters to be set with high degrees of accuracy which could heretofore only be achieved with control devices having internal mircroprocessor components. In this connection, while the monitoring circuit of the instant invention does include microprocessor components, the control device of the instant invention by itself does not. Hence, the construction of the control device of the instant invention is relatively economical compared to the heretofore available control devices having internal microprocessor components. Although the monitoring circuit of the instant invention includes microprocessor components, a single monitoring circuit can be interconnected at different times with different control devices for monitoring respective sensed temperatures, and hence the overall cost for providing an effective system which includes several thermally responsive control devices is substantially reduced when used in combination with the monitoring circuit.

The thermally responsive control device of the instant invention provides a novel and effective means for measuring and indicating temperatures sensed in a bridge circuit. Further, one embodiment of the thermally responsive control device includes a novel bridge circuit wherein three control decisions are effected in response to two sensed temperatures. In another embodiment of the thermally responsive control device of the instant invention, the inherently nonlinear characteristic of a thermistor is compensated for by matching the thermistor with a nonlinear potentiometer so that a substantially linear relation is achieved between the temperature sensed by the thermistor and the degree of movement or manipulation required for changing the resistance of the potentiometer. Accordingly, for these reasons, as well as a number of other reasons which will hereinafter be made apparent, it is seen that the instant invention provides a significant advancement in the electrical art which has substantial commercial merit.

Accordingly, it is an object of the instant invention to provide an effective combination of a thermally responsive control device and a monitoring circuit for providing an effective thermally responsive electrical control as well as visual indications of sensed temperatures.

Another object of the instant invention is to provide a thermally responsive electrical control device wherein a plurality of control decisions are effected in response to a single sensed temperature.

Another object of the instant invention is to provide a thermally responsive control device which comprises a thermally responsive thermistor, wherein the inherent nonlinear characteristic of the thermistor is compensated for by the use of a potentiometer having a corresponding nonlinear characteristic.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
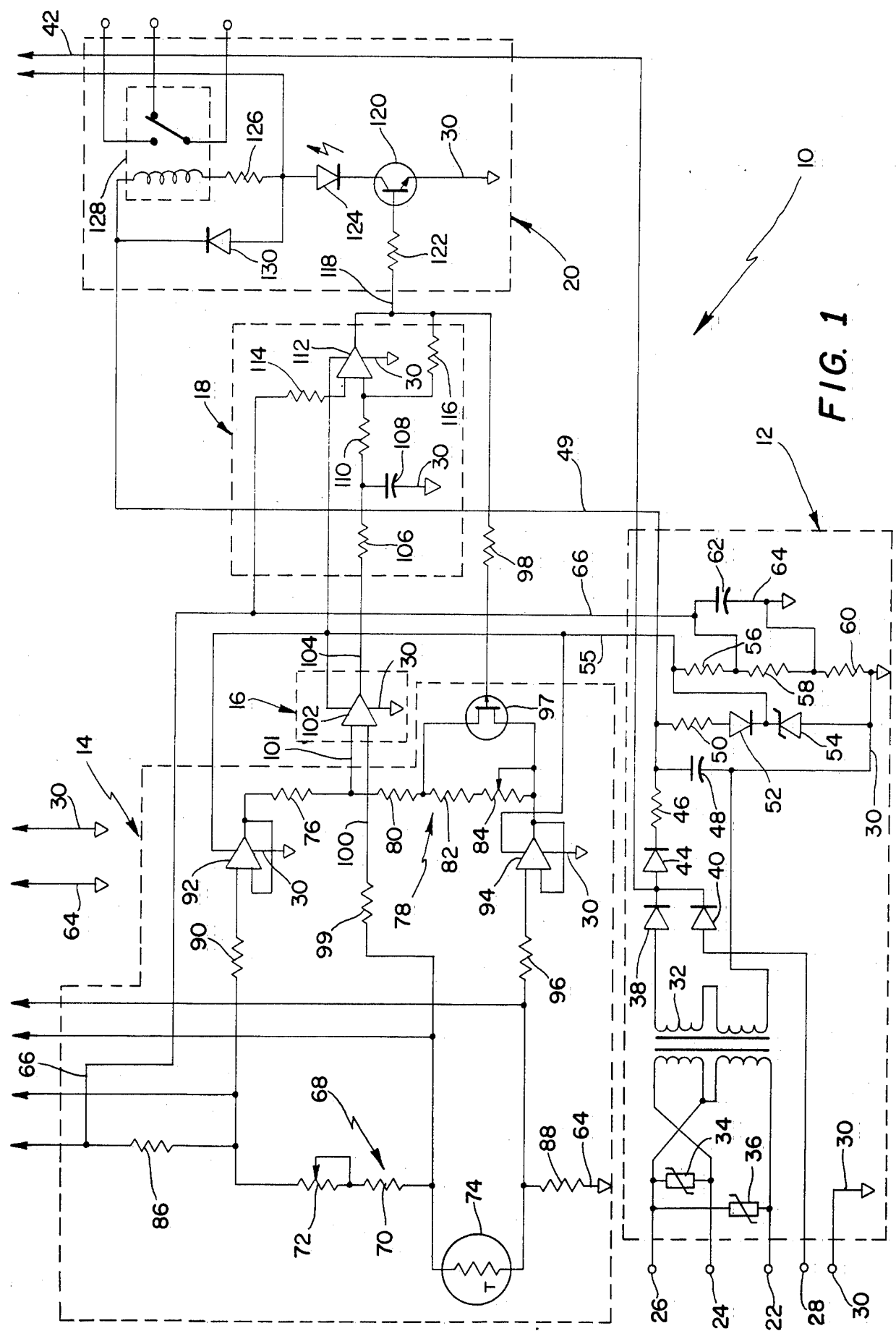
FIG. 1 is a diagrammatic view of a first embodiment of the control device of the instant invention.

Referring now the the drawings, a first embodiment of the thermally responsive electrical control device of the instant invention is illustrated in FIG. 1 and generally indicated at 10. The device 10 is operative for controlling the operation of a system actuating device, such as a control valve and the like, for first and second operating modes such as on and off modes in order to provide a temperature responsive system control. More specifically, the electrical control device 10 is operative for producing an electrical output signal having first and second voltage levels for controlling the operation of the system actuating device for corresponding first and second operating modes.

The device 10 generally comprises a power supply circuit generally indicated at 12, a bridge circuit generally indicated at 14, a comparator circuit generally indicated at 16, a filter circuit generally indicated at 18, and an output circuit generally indicated at 20. The power supply cirucit 12 is operative for producing a DC power supply, and the bridge circuit 14 which is powered by the power supply circuit 12 is operative for sensing a system temperature and for producing first and second electrical signals, one of which has a voltage which is related to the sensed temperature. The comparator circuit 16 is also powered by the power supply circuit 12, and it is operative for comparing the voltages of the first and second signals produced by the bridge circuit 14 and for producing an electrical control signal which has a first voltage level when the voltage of the first bridge signal is greater than the voltage of the second bridge signal and a second voltage level when the voltage of the second bridge signal is greater than the voltage of the first bridge signal. The filter circuit 18 is operative for filtering the control signal produced by the comparator circuit 16 in order to filter out unwanted circuit noise and any momentary transient signals. The output circuit 20 is operative in response to the control signal from the filter circuit 18 for producing a corresponding output control signal having increased voltage and/or current levels in order to make the output signal from the device 10 more compatible with the requirements of conventional system actuating devices. It should be brought out, however, that while the device 10 as herein embodied includes the filter circuit 18 and the output circuit 20, other embodiments of the device of the instant invention which do not include one or both of these circuits are contemplated.

The power supply circuit 12 is operative with either high, intermediate or low AC voltage sources. In this regard, a high level AC voltage source is connectable across conductors 22 and 24, whereas an intermediate AC voltage source is connectable across conductors 24 and 26. A low level AC voltage source is connectable across conductors 28 and 30, the conductor 30 providing a power common output in the device 10. Current from the conductors 22 and 24 or from the conductors 24 and 26 is transformed in a transformer 32 and varistors 34 and 36 are provided for protecting the power supply circuit 12 against line voltage surges. The output voltage from the transformer 32 is half wave rectified by a diode 38 and the low voltage from terminals 28 and 30 is half wave rectified by a diode 40. The half wave rectified signal from the diodes 38 and 40 is interconnected to a common voltage output conductor 42, and a portion of the half wave rectified signal from the diodes 38 and 40 passes through a diode 44 and a resistor 46 and is filtered by a capacitor 48, which is interconnected between a conductor 49 which extends from the resistor 46, and the power common conductor 30. Accordingly, an unregulated DC voltage is produced across the capacitor 48 between the conductors 49 and 30 for use in the output circuit 20 as will hereinafter be more fully set forth. The unregulated DC voltage across the capacitor 48 is also interconnected in parallel to a resistor 50, an LED 52, and a zener diode 54. Accordingly, the LED 52 provides a visual indication of the energization of the device 10 and a constant voltage is produced across the zener diode 54, specifically between a conductor 55 and the power common conductor 30, for use in powering the bridge circuit 14, the comparator circuit 16 and the filter circuit 18. The conductors 55 and 30 are also interconnected to resistors 56, 58, and 60 in parallel with the zener diode 54 so that the resistors 56, 58 and 60 form a voltage divider network between the conductor 55 and the power common 30. A capacitor 62 is connected in parallel with the resistor 58 between a conductor 64 connected between the resistors 58 and 60 and a conductor 66 connected between the resistors 56 and 58, so that a substantially constant voltage is produced between the conductors 64 and 66. The resulting signal produced in the conductor 64 defines a signal common and the resulting signal produced in the conductor 66 defines a positive supply output of the device 10.

The bridge circuit 14 is powered by the voltage between the positive supply output conductor 66 and the signal common conductor 64. The bridge circuit 14 comprises a first resistance element generally indicated at 68 which includes a resistor 70 and a potentiometer 72, a second resistance element or thermistor 74, a third resistance element 76, and a fourth resistance element generally indicated at 78 which includes resistors 80 and 82 and a potentiometer 84. The bridge circuit 14 further comprises a power side resistance element 86 which is connected to the positive supply output conductor 66 and a common side resistance element 88 which is connected to the signal common conductor 64. The first resistance element 68 is connected in series with the power side resistance element 86, so that the potentiometer 72 is interposed between the resistor 70 and the resistance element 86, and the third resistance element 76 is connected to the power side resistance element 86 in series relation through a resistor 90 and an operational amplifier 92 so that the first and third resistance elements 68 and 76, respectively, are interconnected in parallel relation. Preferably the potentiometer 72 is constructed so that it has a resistance to wiper position relationship which approximates the resistance to temperature relationship of the thermistor 74. In other words, the degree of manual movement required for varying the resistance of the potentiometer 72 preferably corresponds in a substantially linear relation over substantially the entire range of the potentiometer 72 to the degree of temperature change required for varying the resistance of the thermistor 74 over substantially the entire reistance range of the thermistor 74. The operational amplifier 92 functions as a voltage follower and accordingly the voltage between the operational amplifier 92 and the third resistance element 76 is substantially equal to the voltage between the power side resistor 86 and the resistance element 90. The thermistor or second resistance element 74 is interconnected in series between the common side resistance element 88 and the resistor 70, and the potentiometer 84 of the fourth resistance element 78 is interconnected in series with the common side resistance element 88 through an operational amplifier 94 and a resistor 96, and also interconnected in series to the third resistance element 76 so that the fourth resistance element 78 is in parallel relation to the thermistor 74. The fourth resistance element 78 is arranged so that the resistor 80 thereof is connected directly to the third resistance element 76 and an FET transistor 97 is interconnected between the resistor 80 and the operational amplifier 94 so that it is in parallel relation with the resistor 82 and the potentiometer 84. The gate of the transistor 97 is connected through a resistor 98 to the filter circuit 18 for providing hysteresis in the bridge circuit 14. Connected between the thermistor 74 and the first resistance element 68 is a resistor 99 which is interconnected through a conductor 100 to the comparator circuit 16, the signal which is transmitted to the comparator circuit 16 through the conductor 100 defining a first electrical signal which is produced by the bridge circuit 14 having a voltage which is mathematically related through known formulae to the ratio of the resistance of the first resistance element 68 to the resistance of the second resistance element or thermistor 74. A conductor 101 is interconnected in the bridge circuit 14 between the third resistance element 76 and the fourth resistance element 78 and extends to the comparator circuit 16, the signal transmitted to the comparator circuit 16 through the conductor 101 defining a second electrical signal of the bridge circuit 14 having a voltage which is mathematically related through known formulae to the ratio of the resistance of the third resistance element to the resistance of the fourth resistance element.

The comparator circuit 16 comprises an operational amplifier 102 which is responsive to the voltage of the signals in the conductors 100 and 101, and is operative for producing an electrical control signal in a conductor 104, which has alternate first and second voltage levels. More specifically, when the voltage level in the conductor 100 is greater than the voltage level in the conductor 101, the operational amplifier 102 is operative for producing an output signal having a first voltage level, and when the voltage level in the conductor 101 is greater than the voltage level in the conductor 100, the operational amplifier 102 is operative for producing an output signal having a second voltage level which is different from the first voltage level.

While it will be understood that the control signal which is produced by the comparator circuit 16 can be used directly for controlling some types of system actuating devices, the thermally responsive electrical control device 10 further comprises the filter circuit 18 and the output circuit 20 for enhancing and modifying the signal which is produced in the conductor 104 so that it is compatible with a wide range of system actuating devices. In this regard, the output signal produced by the comparator circuit 16 in the conductor 104 is filtered with a resistor 106 and a capacitor 108 which is also interconnected to the power common conductor 30, so that the filtered signal passes through a resistor 110 to an operational amplifier 112 which functions as a "Schmitt trigger" to redigitize the filtered signal from the resistor 110 so that a filtered signal is provided in the conductor 118 which has first and second voltage levels. A threshold voltage for the operational amplifier 112 is provided through a resistor 114 which is interconnected to the positive supply output conductor 66, and a resistor 116 is interconnected between the output of the operational amplifier 112 and the filtered signal from the resistor 110 to provide hysteresis for the amplifier 112. The output from the operational amplifier 112 is also interconnected through the resistor 98 to the FET transistor 97 to control the hysteresis function as hereinabove set forth.

The output of the operational amplifier 112 is interconnected to the output circuit 20 through a conductor 118. The conductor 118 transmits a signal from the operational amplifier 112 to the base of a transistor 120 through a resistor 122, the emitter of the transistor 120 being interconnected to the power common conductor 30. The collector of the transistor 120 is interconnected through an LED 124 and a resistor 126 to the coil of a relay 128, the relay 128 being of the type which includes single-pole double-throw contacts. The opposite side of the coil of the relay 128 is interconnected to the unregulated DC voltage in the conductor 49, and a diode 130 is interconnected in parallel to the resistor 126 and the relay 128. Accordingly, the transistor 120 is responsive to the two alternate voltage levels of the signal from the filter circuit 18 for alternately maintaining the relay 128 in energized and deenergized states in order to control the operation of a system actuating device interconnected thereto.

It is seen therefore that the device 10 is effective for controlling the operation of a system actuating device in response to temperature changes in the system. More specifically, as the temperature sensed by the thermistor 74 increases, the resistance of the thermistor 74 correspondingly decreases and vice versa. Hence the ratio of the resistance of the first resistance element 68 to the resistance of the thermistor also changes according to the temperature sensed by the thermistor 74. When this ratio is greater than the ratio of the resistance of the third resistance element 76 to the resistance of the fourth resistance element 78, the comparator operates to produce an electrical control signal having a first voltage level, and when the ratio at the resistance of the first resistance element 68 to the resistance of the thermistor 74 is less than the resistance of the third resistance element 76 to that of the fourth resistance element 78, the comparator circuit 16 operates to produce an electrical output signal having a second voltage level. The relay 128 is responsive to the voltage level of the signal produced by the comparator circuit 16 as it is transmitted through the filter circuit 18 and the output circuit 20 for alternately controlling the operation of a system actuating device so that it is alternately actuated and deactuated in response to the temperature level sensed by the thermistor 74. The FET transistor 97 modifies the temperature response level of the control device 10 depending on the voltage level of the output control signal produced by the filter circuit 18.

Figure 2:
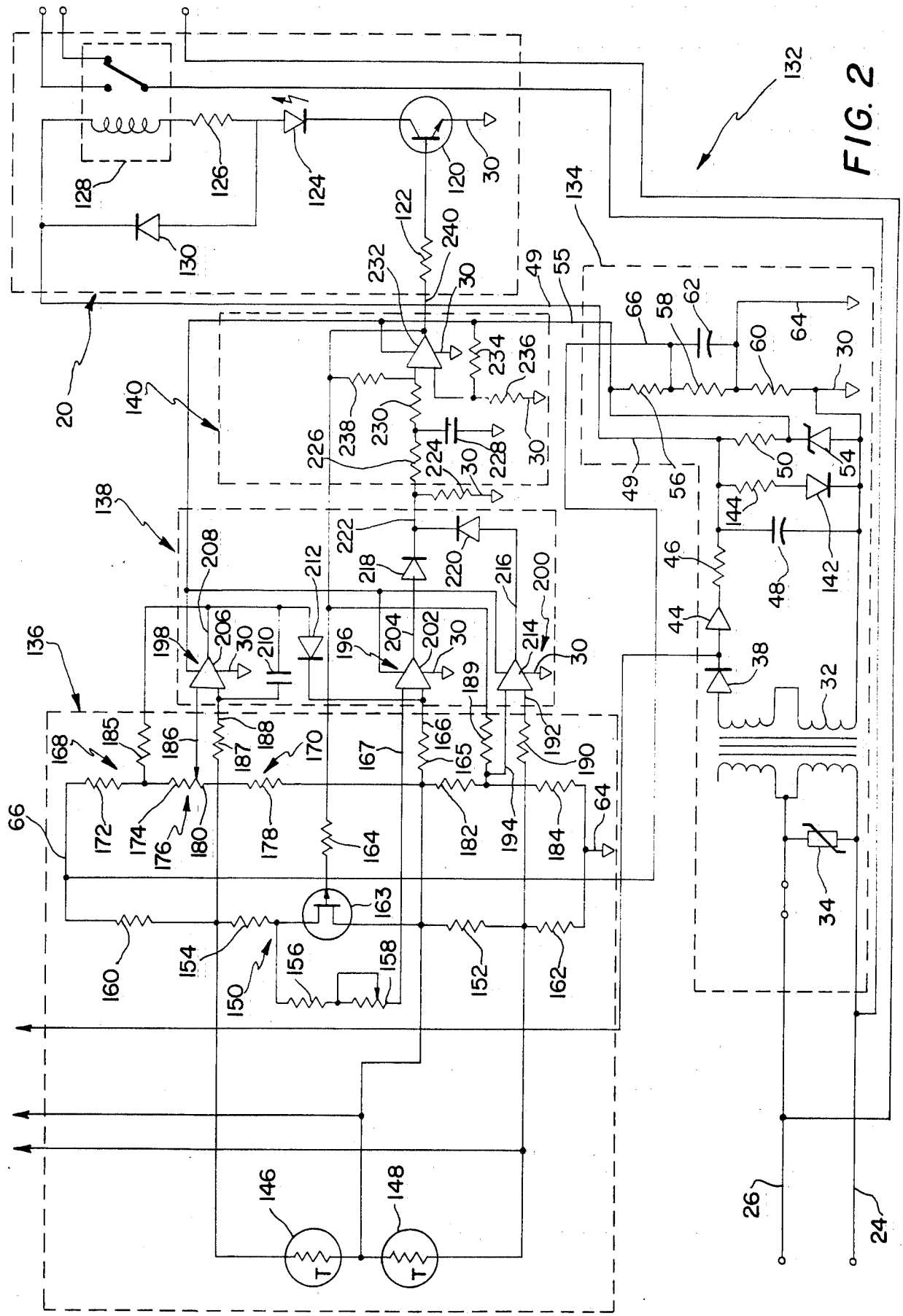
FIG. 2 is a diagrammatic illustration of a second embodiment of the control device.

A second embodiment of the thermally responsive electrical control device of the instant invention is illustrated and generally indicated at 132 in FIG. 2. The device 132 comprises a power supply circuit 134, a bridge circuit 136, which is powered by the power supply circuit 134, a comparator circuit 138, a filter circuit 140, and an output circuit 20, which is substantially the same as the output circuit 20 hereinabove described for the device 10.

The power supply circuit 134 is similar in construction to the power supply circuit 12 of the device 10 and includes many equivalent components, although it is operative for use with a single AC power source instead of three different AC sources. The power supply 134 is connectable to an AC power source through conductors 24 and 26 which are connected to a transformer 32, and a varistor 34 is connected between the conductors 24 and 26 in parallel with the transformer 32. A low voltage AC power supply is provided by the transformer 32 across the two secondary terminals thereof and, one of the secondary terminals is connected in series to the diodes 38 and 44 and a resistor 46. The resistor 46 is interconnected across a capacitor 48 to the other secondary terminal of the transformer 32, the latter secondary terminal providing a power common reference signal in a conductor 30. The unregulated DC voltage across the capacitor 48 provides power for the output circuit 20 through a conductor 49 in accordance with the manner hereinabove set forth in the description of the device 10. The unregulated DC voltage across the capacitor 48 is also interconnected to an LED 142 through a resistor 144, the LED 142 providing a visual indication of the energization of the power supply 134. Also interconnected to the unregulated DC voltage across the capacitor 48 are a resistor 50 and a zener diode 54, so that a constant voltage is produced across the zener diode 54 between conductors 55 and 30 which is utilized to power the comparator circuit 138 and the filter circuit 140. The conductors 55 and 30 are also connected to resistors 56, 58 and 60 which form a voltage divider network, and a capacitor 62 is provided in parallel with the resistor 58 so that a substantially constant DC voltage is provided thereacross. A conductor 64 is interconnected between the resistors 58 and 60 for supplying a signal common output, and a conductor 66 is interconnected between the resistors 56 and 58 for providing a positive supply output.

The bridge circuit 136 is actually a triple bridge circuit comprising first, second and third bridge subcircuits. The first bridge subcircuit comprises first, second, third and fourth resistance elements which are indicated at 146, 148, 150 and 152, respectively. The first resistance element 146 comprises a thermistor, and the second resistance element 148 also comprises a thermistor. The third resistance element 150 comprises resistors 154 and 156 and a potentiometer 158, all of which are connected in series, and the fourth resistance element 152 comprises a resistor. The first and second resistance elements 146 and 148, respectively, are interconnected in series, and the third and fourth resistance elements 150 and 152, respectively, are also interconnected in series. The first and third resistance elements 146 and 150, respectively, are interconnected in series relation and the second and fourth resistance elements 148 and 152, respectively, are also interconnected in series. A power side resistance element 160 is interconnected in series to each of the first and third resistance elements 146 and 150, and a common side resistance element 162 is interconnected in series to each of the second and fourth resistance elements 148 and 152, respectively. An FET transistor 163 is interconnected in parallel with the potentiometer 158 and the resistor 156, and is interconnected through a resistor 164 to the filter circuit 140 for modifying the third resistance element 150 in order to provide hysteresis in the first bridge subcircuit. The interconnection between the thermistor 146 and the thermistor 148 is interconnected through a resistor 165 to a conductor 166 which extends to the comparator circuit 138 for providing a first electrical signal from the first bridge subcircuit which is mathematically related to the ratio of the resistance of the first resistance element 146 to the resistance of the second resistance element 148. A second electrical signal is produced from the first bridge subcircuit in a conductor 167, which is interconnected between the resistors 150 and 152, the voltage of this second signal being mathematically related to the ratio of the resistance of the third resistance element 150 to the resistance of the fourth resistance element 152.

The second bridge subcircuit comprises the first resistance element 146, a fifth resistance element which comprises the resistor 160, a sixth resistance element generally indicated at 168, and a seventh resistance element 170. The sixth resistance element 168 includes a resistor 172 and a portion 174 of the resistance of a potentiometer 176, and the seventh resistance element 170 comprises a resistor 178 and the remaining portion 180 of the potentiometer 176. The second bridge subcircuit is arranged so that the fifth and first resistance elements 160 and 146, respectively, are interconnected in series and so that the sixth and seventh resistance elements 168 and 170, respectively, are also interconnected in series. The fifth and sixth resistance elements 160 and 168, respectively, are interconnected in parallel relation with respect to each other to the positive supply output conductor 66. The first and seventh resistance elements 146 and 170, respectively, are interconnected in series relation with respect to each other to the signal common conductor 64 through the thermistor 148 and the resistor 162. The first and seventh resistance elements 146 and 170, respectively, are also interconnected in series relation with respect to each other to the signal common conductor 64 through a resistor 182 and a resistor 184. A resistor 186 is interconnected between the resistor 172 and the potentiometer portion 174 in the comparator circuit 138 for providing hysteresis in the second bridge subcircuit. The interconnection between the resistor 160 and the thermistor 146 is interconnected through a resistor 187 to a conductor 188 which extends to the comparator circuit 138 for providing a third electrical signal from the second bridge subcircuit which is mathematically related to the ratio of the resistance of the fifth resistance element 160 to the resistance of the first resistance element 146. A fourth electrical signal is produced from the second bridge subcircuit in a conductor 186, which is interconnected between the resistance elements 168 and 170, the voltage of this fourth signal being mathematically related to the ratio of the resistance of the sixth resitance element 168 to the resistance of the seventh resistance element 170.

The third bridge subcircuit comprises the second resistance element 148, an eighth resistance element, comprising the resistor 162, a ninth resistance element, comprising the resistor 182, and a tenth resistance element, comprising the resistor 184. The thermistor 148 is interconnected in series with the resistor 162, whereas the resistor 182 is interconnected in series with the resistor 184. The resistors 162 and 184, respectively, are interconnected in parallel relation with respect to each other to the signal common conductor 64, and the thermistor 148 and the resistor 182 are interconnected in parallel relation with respect to each other to the positive supply output conductor 66 through the thermistor 146 and the resistor 160, and through the seventh and sixth resistance elements 170 and 168, respectively. A resistor 188 is interconnected to the third bridge subcircuit between the resistors 182 and 184 and extends to the filter circuit 140 for providing hysteresis in the third bridge subcircuit. The interconnection between the thermistor 148 and the resistor 162 is interconnected through a resistor 190 to a conductor 192 which extends to the comparator circuit 138 for providing a fifth electrical signal from the third bridge subcircuit which is mathematically related to the ratio of the resistance of the second resistance element 148 to the resistance of the eighth resistance element 162. A sixth electrical signal is produced from the third bridge subcircuit in a conductor 194, which is interconnected between the resistors 182 and 184, the voltage of this sixth signal being mathematically related to the ratio of the resistance of the nineth resistance element 182 to the resistance of the tenth resistance element 184.

The comparator circuit 138 comprises first, second and third comparator subcircuits 196, 198 and 200, respectively, which are responsive to the signals produced by the first, second and third bridge subcircuits, respectively. The first comparator subcircuit 196 comprises an operational amplifier 202 which is responsive to the voltages in the conductors 166 and 167, and it is operative for producing a first electrical control signal having first and second voltage levels in a conductor 204. More specifically, when the voltage of the signal in the conductor 166 is greater than the voltage of the signal in the conductor 167, the operational amplifier 202 is operative for producing a first control signal in the conductor 204 having a first voltage level, and when the voltage of the signal in the conductor 167 is greater than the voltage of the signal in the conductor 166, the operational amplifier 202 is operative for producing a first control signal in the conductor 204 having a second voltage level which is different from the first voltage level.

The second comparator subcircuit 198 comprises an operational amplifier 206 which is interconnected to an output conductor 208, and a capacitor 210 which is interconnected in parallel to the amplifier 206 between conductors 208 and 188. The second comparator subcircuit 198 is operative in a manner similar to the first comparator subcircuit 196 for producing a second electrical control signal in the conductor 208 having third and fourth voltage levels which are generally the same as the first and second voltage levels, respectively, hereinabove discussed in response to a comparison of the voltage levels in the conductors 186 and 188. The capacitor 210 operates to filter out noise and transient signals which may be present in the conductors 186 and 188. The second electrical control signal which is produced in the conductor 208 is interconnected through a diode 212 to the first comparator subcircuit 196 through the conductor 166, whereby the second comparator subcircuit 198 is operative for overriding the first comparator subcircuit 196 when the output of the second comparator subcircuit 198 is in the second voltage level thereof, so that the first comparator subcircuit 196 is operated in the the first voltage level thereof when this condition occurs.

The third comparator subcircuit 200 comprises an operational amplifier 214 which is interconnected to the conductors 192 and 194 and is operative for producing a third electrical control signal in a conductor 216. The third comparator subcircuit 200 is operative in a manner similar to the first comparator subcircuit 196, for producing a third electrical control signal having fifth and sixth voltage levels which are generally the same as the first and second voltage levels, respectively, hereinabove discussed in response to a comparison of the voltages of the signals in the conductors 192 and 194.

The first and third electrical control signals produced by the first and third comparator circuits 196 and 200, respectively, and the conductors 204 and 216, respectively, are interconnected through diodes 218 and 220, respectively, to a conductor 222 which is interconnected to the power common conductor 30 through a resistor 224. Accordingly, the diodes 218 and 220 cooperate to form a "logical or" function, which is responsive to the signals in the conductors 204 and 216.

The filter circuit 140 is interconnected to the comparator circuit 138 through the conductor 222. In this regard, while the signal which is produced by the comparator circuit 138 in the conductor 222 as well as each of the signals in the conductors 204, 208 and 216 can be utilized directly for controlling some types of system actuating devices, the device 132 as herein set forth further comprises the filter circuit 140 and the output circuit 20 for enhancing and modifying the signal which is produced in the the conductor 222 so that it is compatible with a wide range of system actuating devices. The output signal produced by the comparator circuit 138 in the conductor 222 is filtered with a resistor 226 and a capacitor 228, and the filtered signal passes through a resistor 230 to an operational amplifier 232 which functions as a "Schmitt trigger" to redigitize the filtered signal from the resistor 230. A threshold voltage for the operational amplifier 232 is provided by a voltage divider network which is formed by resistors 234 and 236 which are connected between the conductor 55 from the zener diode 54 and the power common conductor 30. A resistor 238 is interconnected between the output of the operational amplifier 232 and the filtered signal from the resistor 226 to provide hysteresis for the "Schmitt trigger". The output of the operational amplifier 232 is also interconnected through the resistor 164 to the FET transistor 163 to control the hysteresis function of the first bridge subcircuit, and the output from the operational amplifier 232 is further connected to the resistor 189 to control the hysteresis function of the third bridge subcircuit as hereinabove set forth.

The output of the conductor 240 from the operational amplifier 232 is interconnected to the output circuit 20 which is substantially the same as the output circuit 20 hereinabove described in connection with the control device 10. The output circuit 20 in the device 132 is responsive to the two alternate voltage levels of the signal in the conductor 240 from the filter circuit 140 for alternately maintaining the relay 128 in energized and deenergized states.

It is seen therefore that the device 132 is effective for controlling the operation of a system actuating device in response to system temperature changes. The device 132 is operative for sensing two different system temperatures and for comparing these two temperatures to respective set points thereof determined by potentiometers in the bridge circuit 136 and also for comparing these two temperatures to each other. In response to these comparisons, the device 32 is operative for producing an output control signal for controlling the operation of a system actuating device in order to achieve a desired system control. More specifically, the device 132 is operative for producing an output control signal having first and second voltage levels, wherein the second voltage level is maintained when either of two temperature conditions is sensed. The first of these temperature conditions occurs when the thermistor 148 senses a temperature which is less than a threshold temperature determined by the resistors 182 and 184, and the second of these conditions occurs when the thermistor 148 senses a temperature which is higher than the temperature sensed by the thermistor 146, and the temperature sensed by the thermistor 146 is less than a threshold temperature determined by the resistances of the sixth and seventh resistance elements 168 and 170, respectively. Under all other temperature conditions, the output control signal from the device 32 is maintained in the first voltage level thereof.

Figure 3:
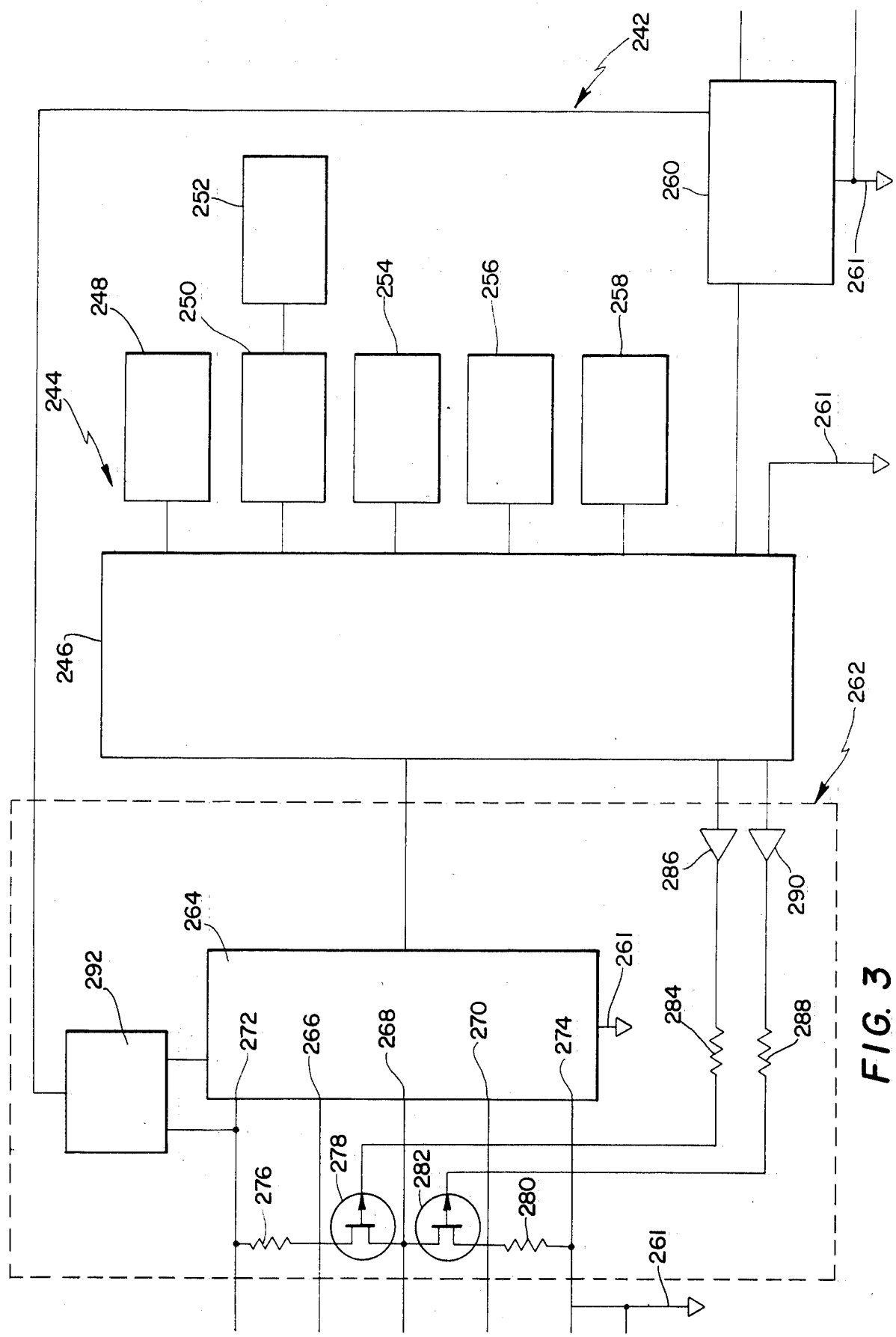
FIG. 3 is a diagrammatic view of the monitoring circuit of the instant invention.

Each of the devices 132 and 10 is also operative in combination with a monitoring circuit which is interconnectable to the bridge circuit 14 or to the bridge circuit 136, the monitoring circuit being illustrated in FIG. 3 and generally indicated at 242. The monitoring circuit 242 includes a microprocessor generally indicated at 244 which is illustrated in block diagram form, and comprises a single chip microcomputer 246, and peripheral circuits for a keyboard 248, a display driver 250 connected to a display 252, programming switches 254, an oscilllator 256, and a power up reset circuit 258. The microcomputer 246 and the peripheral circuits connected thereto are powered by an internal power supply 260 having a common supply conductor 261, the power supply 260 being energized by a power supply preferably comprising one of the power supplies 12 or 134, but which could alternately comprise a separate power supply of conventional construction. The monitoring circuit 242 further comprises a temperature measuring circuit 262 which is interconnnected to the microprocessor 244 and which is connectable to either of the bridge circuits 14 or 136. The temperature measuring circuit 262 comprises an analog-to-digital voltage converter 264 having first, second and third input channels 266, 268 and 270, respectively, a voltage reference channel 272 and a common channel 274 which is connected to the common supply conductor 261. The temperature measuring circuit 262 further comprises a resistor 276 and a transistor 278 which are interconnected in series between the voltage reference channel 272 and the second input channel 268, and a resistor 280 and a transistor 282 are interconnected in series between the common channel 274 and the second input channel 268. The gate of the transistor 278 is interconnected through a resistor 284 and a buffer 286 to the microprocessor 246, and the gate of the transistor 282 is interconnected through a resistor 288 and a buffer 290 to the microprocessor 246. Also included in the temperature measuring circuit 262 is a voltage converter 292 which is connected to the power supply 260 for providing power to the analog-to-digital converter 264 and also for defining a reference voltage in the reference channel 272.

The monitoring circuit 242 is operative for measuring and indicating sensed temperatures indicated by the thermistor 74 or simulated temperatures represented by the resistances of the first and second resistance elements 68 and 74, respectively, of the bridge circuit 14 or for measuring and indicating the temperatures sensed by the thermistors 146 and 148 of the bridge circuit 136. For use in combination with the control device 10, the monitor circuit 242 is interconnected to the bridge circuit 14. Specifically, the voltage reference channel 272 is interconnected to the positive supply output conductor 66, and the first input channel 266 is interconnected to bridge 14 between the resistor 86 and the first resistance element 68. The second input channel 268 is interconnected to the bridge circuit 14 between the first and second resistance elements 68 and 74, respectively, and the third input channel 270 is interconnected between the second resistance element 74 and the common side resistor 88. The common channel 274 is interconnected to the signal common conductor 64 and the power common conductor 30.

During use and operation of the monitoring circuit 242 in combination with the device 10, the microcomputer 246, is operable to emit a momentary signal through the buffer 286 and the resistor 284 to cause the transistor 278 to be momentarily actuated in a conductive state so that the resistor 276 is interconnected in parallel with the first resistance element 68 and the power side resistor 86. As a result, the voltage across the resistor 88 and the thermistor 74 is momentarily increased substantially. Immediately thereafter the microprocessor 246 operates to actuate the analog-to-digital converter 264 so that it measures the voltage levels present at the second and third input channels 268 and 270, respectively. As soon as the analog-to-digital converter 264 has completed these voltage measurements, the signal from the microprocessor to the transistor 278 is terminated so that the transistor 278 returns to its normal high impedance state. The microcomputer 246 then computes the resistance of the thermistor 74 based on the voltages at the second and third channels 268 and 270, respectively, and the known resistance of the resistor 88, and the microcomputer 246 converts this computed resistance to a corresponding temperature reading which is transmitted through the display driver 250 to the display 252 where a visual indication of temperature is produced. In a similar manner, the temperature simulated by the first resistance element 68 can be sensed by the temperature sensing circuit 262, computed in the microcomputer 246 and displayed on the display 252. During the measurement operation, the bridge circuit may apply false controlling signals to the comparator 102, and the filter circuit 18 prevents the device 10 from producing output signals which are responsive to the false signals produced by the monitor circuit 242.

For use of the monitor circuit 242 in combination with the device 132, the voltage reference channel 272 is interconnected to the positive supply output conductor 66, and the first input channel 266 is interconnected to the bridge circuit 136 between the resistor 160 and the first resistance element 146. The second input channel 268 is interconnected to the bridge circuit 136 between the first and second resistance elements 146 and 148, respectively. The third input channel 270 is interconnected to the bridge circuit 136 between the second resistance element 148 and the resistor 162, and the common input 274 is interconnected to the signal common conductor 64 and the power common conductor 30. When the monitor circuit 242 is interconnected to the device 132 in this manner, it is operative for monitoring the temperature sensed by the thermistor 148 or the temperature sensed by the thermistor 146 in substantially the same manner hereinabove described regarding the combination of the monitoring circuit 242 with the device 10, and the filter circuit 140 operates in the same manner as the filter circuit 18.

It is seen therefore that the instant invention provides an effective thermally responsive electrical control device for controlling the operation of a system actuating device. Further, the instant invention provides an effective combination of an electrical control device with a monitoring device for providing visual indications of sensed temperatures as well as control parameters from a single bridge circuit. Further, the multiple bridge circuit embodied in the device 132 provides an effective means for achieving multiple temperature control decisions from a single temperature sensor. The device 10 is effective over an extended temperature range as a result of the potentiometer 72 which has a resistance range which corresponds in a substantially linear relation with the resistance range of the thermistor 74. Accordingly, for all of the above reasons, it is seen that the instant invention represents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A thermally responsive electrical control device for producing an electrical signal having first and second voltage levels for controlling the operation of a system actuating device for first and second operating modes thereof, respectively, said control device comprising:
   (a) a DC power supply circuit;
   (b) a thermally responsive bridge circuit powered by said power supply circuit, said bridge circuit having first, second, third and fourth resistance elements, said first resistance element comprising a thermistor, said second resistance element residing on the same side of said bridge circuit as said first resistance element and comprising a variable resistance element which is manually adjustable for varying the resistance thereof over a predetermined resistance range, the degree of manual movement required for varying the resistance of said second resistance element corresponding in a substantially linear relation over substantially said entire resistance range thereof to the degree of temperature change required for varying the resistance of said thermistor over a corresponding resistance range of said thermistor in order to match said second resistance element to said thermistor, said bridge circuit being operative for producing a first electrical signal having a voltage which is related to the ratio of the resistance of said first resistance element to the resistance of said second resistance element and a second electrical signal which is related to the ratio of the resistance of said third resistance element to the resistance of said fourth resistance element; and
   (c) a comparator circuit for comparing said first signal voltage to said second signal voltage and for producing an electrical control signal having a voltage which is substantially equal to said first voltage level when said first signal voltage is greater than said second signal voltage, and a voltage which is substantially equal to said second voltage level when said second signal voltage is greater than said first signal voltage.

2. A thermally responsive electrical control device for producing a first electrical control signal having first and second voltage levels for controlling the operation of a first system actuating device for first and second operating modes thereof, respectively, and a second electrical control signal having third and fourth voltage levels for controlling the operation of a second system actuating device for first and second operating modes thereof, said control device comprising:
   (a) a DC power supply circuit;
   (b) a thermally responsive double bridge circuit having first and second bridge subcircuits and including first, second, third, fourth, fifth, sixth and seventh resistance elements, one of said first or second resistance elements being thermally responsive, said first bridge subcircuit including said first, second, third, and fourth resistance elements and being operative for producing a first electrical signal having a voltage which is related to the ratio of the resistance of said first resistance element to the resistance of said second resistance element and a second electrical signal which is related to the ratio of the resistance of said third resistance element to the resistance of said fourth resistance element, said second subcircuit including said fifth, sixth and seventh resistance elements and one of said first or second resistance elements and being operative for producing a third electrical signal having a voltage which is related to the ratio of the resistance of said sixth resistance element to the resistance of said seventh resistance element and a fourth electrical signal which is related to the ratio of the resistance of said fifth resistance element to said other resistance element included in said second subcircuit; and
   (c) a comparator circuit having first and second comparator subcircuits, said first comparator subcircuit being operative for comparing said first signal voltage to said second signal voltage and for producing a first electrical control signal having a voltage level which is substantially equal to first voltage level when said first signal voltage is greater than said second signal voltage and a voltage which is substantially equal to said second voltage level when said second signal voltage is greater than said first signal voltage, said second comparator circuit also being operative for comparing said third signal voltage to said fourth signal voltage and for producing a second electrical control signal having a voltage level which is substantially equal to said third voltage level when said third signal voltage is greater than said fourth signal voltage and a voltage which is substantially equal to said fourth voltage level when said fourth signal voltage is greater than said third signal voltage.

3. A thermally responsive electrical control device for producing an electrical signal having first and second voltage levels for controlling the operation of a system actuating device for first and second operating modes thereof, respectively, said control device comprising:
   (a) a DC power supply circuit providing a DC voltage source having positive and common power supply outputs;
   (b) a thermally responsive bridge circuit powered by said power supply circuit, said bridge circuit having first, second, third and fourth resistance elements and power and common side resistance elements, said power side resistance element being positioned in series relation between said power supply positive output and said first resistance element and also in series relation between said power supply circuit and said third resistance element, said first and third resistance elements being positioned in parallel relation with respect to each other, said common side resistance element being positioned in series relation between said second resistance element and said power supply common output and also in series relation beteen said fourth resistance element and said power supply common output, said second and fourth resistance elements being positioned in parallel relation with respect to each other, said bridge circuit being operative for producing a first electrical signal having a voltage which is related to the ratio of the resistance of said first resistance element to the resistance of said second resistance element, and a second electrical signal which is related to the ratio of the resistance of said third resistance element to the resistance of said fourth resistance element, one of said first and second resistance elements being thermally responsive;

(c) a comparator circuit for comparing said first signal voltage to said second signal voltage and for producing an electrical control signal having a voltage which is substantially equal to said first voltage level when said first signal voltage is greater than said second signal voltage, and a voltage which is substantially equal to said second voltage level when said second signal voltage is greater than said first signal voltage;

(d) a monitor circuit interconnectable to said bridge circuit and to said power supply, said monitor circuit being operative for producing momentary decreases in the resistance of one of said first or second resistance elements and for sensing the resistance across the other of said first or second resistance elements while the resistance of said one of first or second resistance elements is in a decreased state, said monitor circuit also being operative for producing a visual indication of a temperature which corresponds to said sensed resistance but being disconnectable from said bridge circuit without interrupting the operation of said bridge circuit; and (e) a filter circuit for filtering said control signal and for producing a filtered output signal which is substantially unaffected by said momentary decreases in the resistance of one of said first or second resistance elements.

4. In the device of claim 3, said monitor circuit comprising:

(a) a temperature sensing circuit operative for producing said momentary resistance decreases and for sensing the voltage levels on the both sides of said other of said first or second resistance elements and also the voltage levels on both sides of said one of said common or power side resistance elements connected in series therewith, and for producing digital signals which correspond to said sensed voltage levels; and (b) a microprocessor circuit connected to said temperature sensing circuit and operable for determining said sensed resistance from said digital signals and for producing said visual indications in response thereto.

5. In the device of claim 3, said thermally responsive resistance element further characterized as a thermistor, said other of said first and second resistance elements comprising a variable resistance element which resides on the same side of said bridge circuit as said thermistor and which is manually adjustable for varying the resistance thereof over a predetermined resistance range, the degree of manipulation required for varying the resistance of said other of said first or second resistance elements corresponding in a substantially linear relation over substantially said entire resistance range thereof to the degree of temperature change required for varying the resistance of said thermistor over a corresponding resistance range of said thermistor in order to match said second resistance element to said thermistor.

* * * * *